United States Patent [19]

Brezosky

[11] 4,293,170

[45] Oct. 6, 1981

[54] THRUST BEARING ASSEMBLY

[75] Inventor: Bernard J. Brezosky, Louisville, Ky.

[73] Assignee: General Electric Company, Louisville, Ky.

[21] Appl. No.: 96,713

[22] Filed: Nov. 21, 1979

[51] Int. Cl.³ ............................................. F16C 17/08
[52] U.S. Cl. ..................................... 308/161; 308/163; 308/168; 308/DIG. 8
[58] Field of Search ............... 308/121, 132, 135, 160, 308/161, 163, 168, 171, DIG. 5, DIG. 8

[56] References Cited

U.S. PATENT DOCUMENTS

| 1,036,270 | 8/1912 | Kreher | 308/161 |
| 1,912,101 | 5/1933 | Short | 308/171 |
| 2,043,790 | 6/1936 | Baker | 308/163 |
| 2,406,891 | 2/1946 | Newton et al. | 308/123 |
| 2,716,579 | 8/1955 | Staak | 308/163 |
| 3,725,973 | 4/1973 | Gwozdz | 308/135 X |

Primary Examiner—Frederick R. Schmidt
Attorney, Agent, or Firm—H. Neil Houser; Radford M. Reams

[57] ABSTRACT

A thrust bearing assembly for a horizontally disposed drive shaft including an annular thrust bearing loosely carried on the drive shaft, and a drive ring drivingly connected to the drive shaft for rotational and axial motion with the shaft and operative to transmit the axial and rotational motion of the shaft to the annular thrust bearing. Preferably, the annular thrust bearing is formed of a powdered metal or carbon graphite composition. The drive ring includes fingers formed at its periphery projecting toward the thrust bearing. Slots for receiving these fingers are provided at the periphery of the annular thrust bearing. When assembled on the drive shaft, the drive ring is fixedly attached to the drive shaft adjacent the annular thrust bearing with the fingers engaged in the thrust bearing slots.

7 Claims, 2 Drawing Figures

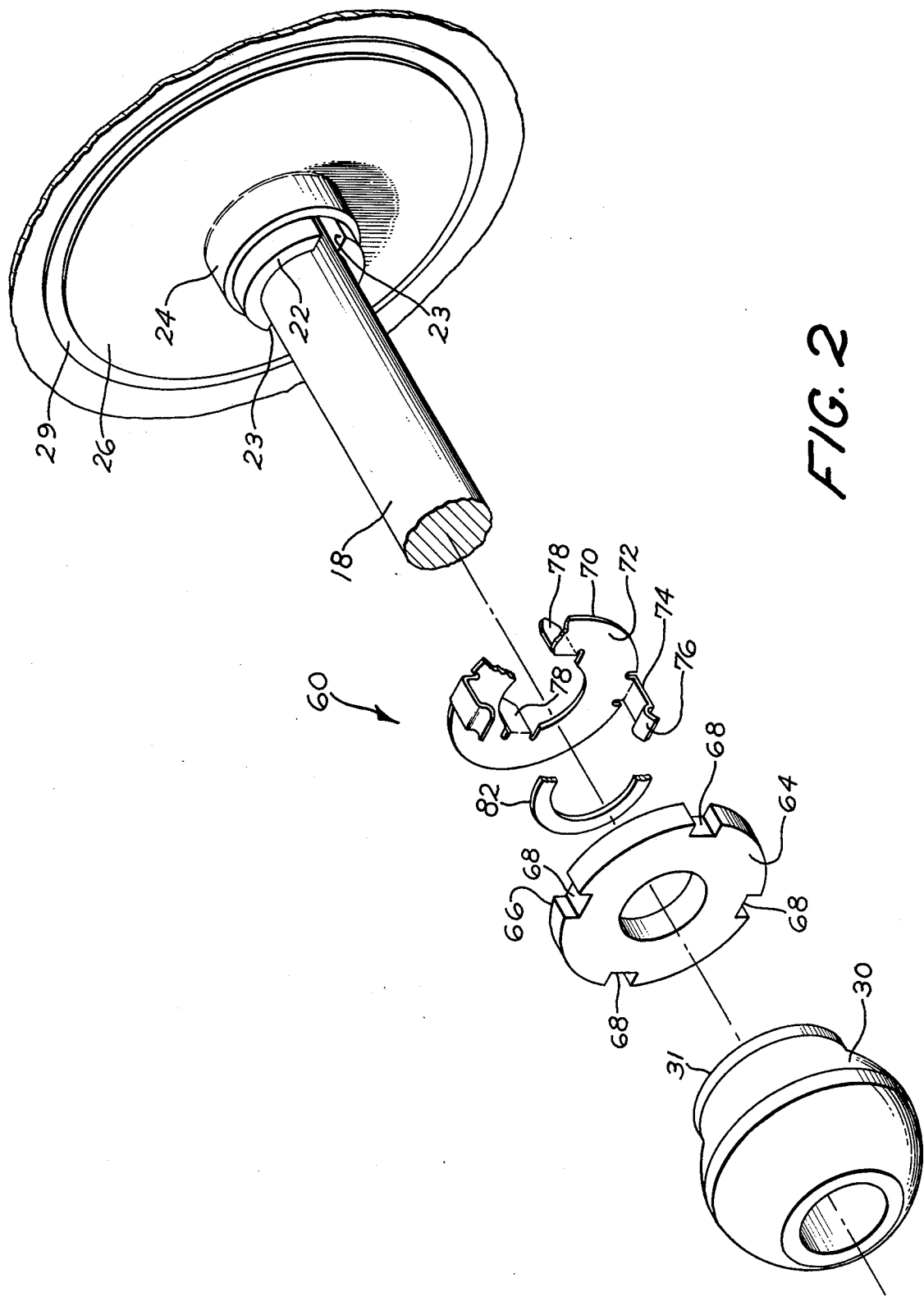

THRUST BEARING ASSEMBLY

BACKGROUND OF THE INVENTION

This invention relates to a thrust bearing assembly for a horizontally disposed rotatable shaft.

Many types of thrust bearings have been used in the past for absorbing the axial thrust of a rotatable shaft. Ball, roller or needle bearings have been used with significant success. An example of the use of needle bearings is described in U.S. Pat. No. 3,393,025 to Jenkins, assigned to the General Electric Company, assignee of the present invention. In applications calling for shafts rotating at a relatively high speed on the order of several thousand revolutions per minute this type of bearing may become noisy since under certain loading conditions which occur intermittently during motor operations the needles tend to skid rather than roll. In addition, this type of arrangement tends to be structurally complex. The needle bearing arrangement disclosed by Jenkins, for example, calls for four parts: a spring, two thrust bearing races, and a needle thrust bearing.

Another type of thrust bearing is the simple thrust plate which may be dry or lubricated. The dry thrust plate, due to the absence of lubrication is limited in its usefulness to comparatively low thrust forces and low speed applications. Lubricated thrust plates have proven quite successful for use on vertical shafts where the bearing can be immersed in lubricant so that a dynamic oil film is readily maintained. However, in horizontal shaft applications, maintaining a dynamic oil film on the thrust plate for lubrication is more difficult. One approach to this problem is disclosed in U.S. Pat. No. 3,423,138 to Hardy, assigned to the General Electric Company, assignee of the present invention. Hardy discloses an improved thrust bearing and lubricating system which comprises a rotating thrust plate formed from hardened tool steel, which rotates against a stationary thrust plate of nylon, both bearings being enclosed at least partially in a housing formed from an acetal copolymer for a horizontal rotating shaft application. In the Hardy arrangement axial thrust is transmitted from the rotating thrust bearing mounted within the housing to a stationary thrust bearing within the housing and from the stationary thrust bearing to a spherical support bearing. The Hardy arrangement requires the bearing housing to retain lubricating oil around the bearings so as to maintain the protective lubricating film between the rotating thrust bearing and the stationary bearing surfaces.

Bearings formed from a porous composition such as a sintered or powdered metal composition which can be saturated with oil, or formed from a self-lubricating material such as graphite, have less stringent lubrication requirements than metal alloy bearings. However, these composition materials, while strong in compression, tend to be relatively weak in tension. Thus, the press fitting of such a bearing with the shaft to rotate with the shaft may subject the bearing to excessive tensile stress, causing the bearing to break during assembly or in operation. Use of a simple thrust bearing loosely carried on the shaft for random rotation is undesirable because such a bearing may intermittently rotate against the wrong bearing surface, causing the bearing to deteriorate or break apart. In order to use powdered metal or graphite thrust bearings, a thrust bearing assembly including means for rotating the bearing with the shaft which does not subject the bearing to excessive tension is required.

Thus, it is desirable to provide an improved thrust bearing assembly for use with a horizontally disposed rotating shaft which approaches the structural simplicity of the dry thrust plate yet which provides satisfactory lubrication for high speed application.

Accordingly, it is an object of this invention to provide an improved thrust bearing assembly for a rotatable shaft.

It is another object of this invention to provide an improved thrust bearing assembly for a rotatable shaft which is relatively quiet and relatively structurally simple.

It is another object of this invention to provide an improved thrust bearing assembly for use with a horizontally disposed shaft employing a porous powdered metal thrust bearing.

It is another object of this invention to provide an improved thrust bearing assembly for use with a horizontally disposed shaft employing a thrust bearing formed from a self-lubricating composition.

It is another object of this invention to provide an improved thrust bearing assembly for use with a horizontally disposed rotating shaft employing a thrust bearing formed from a powder metal or graphite composition which rotates with the shaft.

SUMMARY OF THE INVENTION

Briefly stated, in accordance with one embodiment of the present invention a thrust bearing assembly is provided for a horizontally disposed drive shaft, said shaft being rotatably supported by at least one non-rotating support bearing. An annular thrust bearing loosely carried on the drive shaft is disposed adjacent the non-rotating support bearing. The thrust bearing has a first thrust bearing surface facing the support bearing and a second thrust bearing surface facing away from the support bearing. A drive ring is carried on the drive shaft and has a thrust transmitting surface facing the second thrust bearing surface of the thrust bearing. Means are provided for drivingly connecting the drive ring to the drive shaft for rotational and axial motion with the shaft. Further means are provided for drivingly connecting the thrust bearing to the drive ring to drive the thrust bearing rotationally and axially in concert with the drive ring.

More specifically, in accordance with one embodiment of the present invention, an annular thrust bearing formed from a powdered metal composition is provided having first and second oppositely facing thrust bearing surfaces and a plurality of spaced apart slots formed on its outer periphery. The thrust bearing is loosely carried on the drive shaft adjacent the support bearing, with the first thrust bearing surface facing the non-rotating support bearing. Means are provided for supplying lubricant to the support bearing. This lubricant migrates along the shaft to a barrier formed by an oil seal disposed adjacent the second thrust bearing surface of the thrust bearing. A portion of this lubricant is absorbed by the porous thrust bearing and serves to lubricate the thrust bearing. An annular drive ring having a thrust transmitting surface is carried on the shaft adjacent the oil seal with the thrust transmitting surface facing the second thrust bearing surface. The drive ring includes a first set of fingers projecting from its outer periphery generally toward the thrust bearing for engaging corresponding slots on the periphery of the thrust bearing. A collet is fixedly mounted to the drive shaft adjacent the drive ring for rotation and translation with the shaft. This collet includes a set of longitudinal slots for receiving a second set of fingers which project from the inner periphery of the drive ring. Thus, rotational and translational motion of the shaft is transmitted from the shaft to the collet, to the drive ring and finally to the thrust bearing which rotates and translates with the shaft and which absorbs axial thrust exerted by the shaft toward the non-rotating support bearing.

In accordance with another embodiment of the present invention, a thrust bearing formed from a self-lubricating material such as graphite is substituted for the powdered metal thrust bearing in the above described embodiment. This embodiment is particularly useful in applications in which means for lubricating the shaft support bearing means are not provided.

BRIEF DESCRIPTION OF THE DRAWINGS

It is believed that the invention will be better understood from the following description taken in connection with the accompanying drawings in which:

FIG. 2 is an exploded perspective view of an illustrative embodiment of the thrust bearing assembly of the present invention.

DETAILED DESCRIPTION OF THE INVENTION

Figure 1:
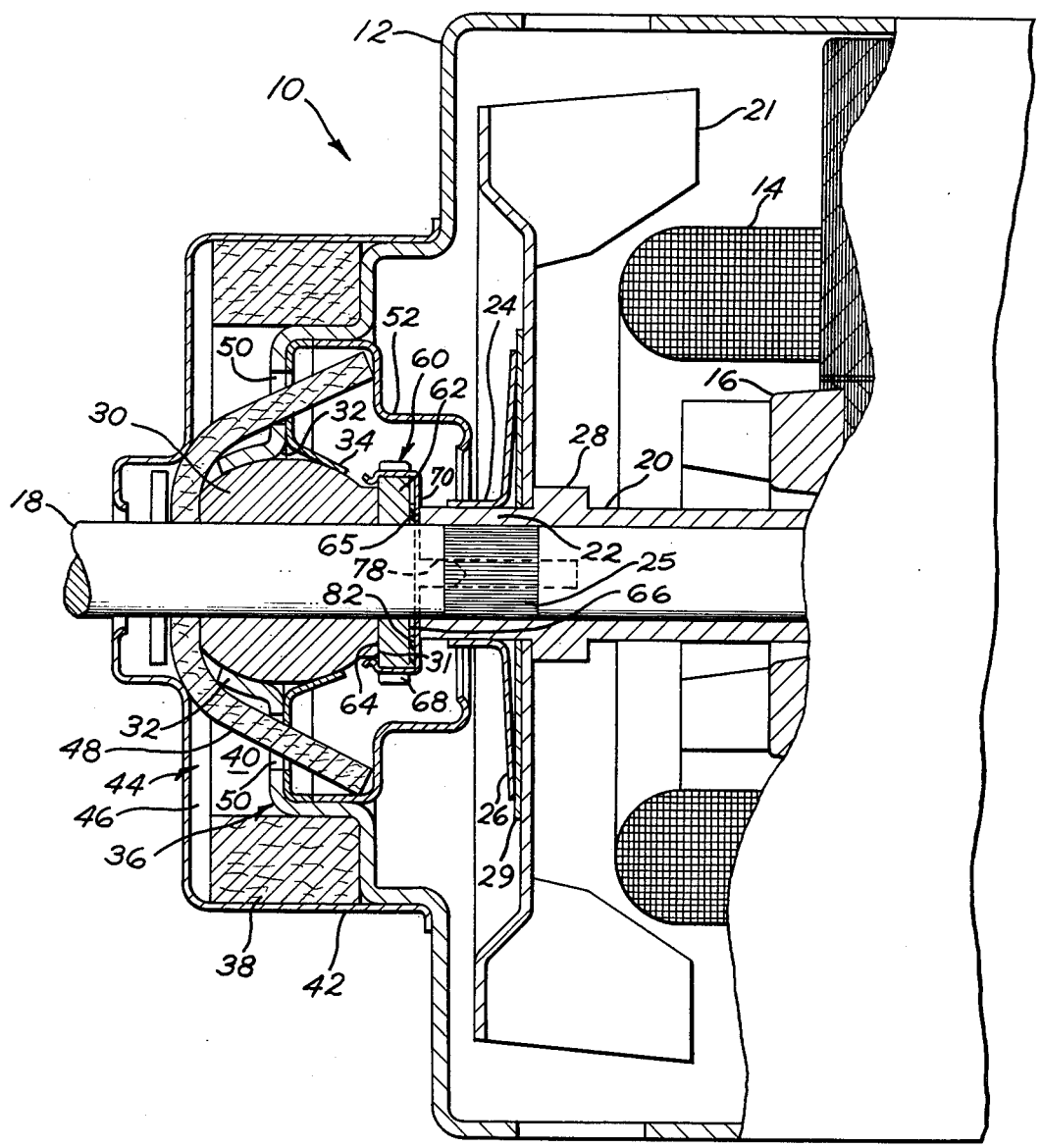
FIG. 1 is a fragmentary elevational view partially cut away and partially in section to show details of an electric motor incorporating an illustrative embodiment of the bearing assembly of the present invention.

Referring now to the drawings, and particularly to FIG. 1 thereof, there is shown an electric motor 10 having an outer casing 12 which supports a stator 14 therein. Stator 14 has a central opening therethrough which receives an armature 16 carried by a rotatable shaft 18. Shaft 18 also carries a collet 20 which slips over shaft 18 to support a motor cooling fan 21. Collet 20 includes an end portion 22 having a pair of substantially longitudinal slots 23 (FIG. 2). Fan 21 is secured to collet 20 by means of a sleeve 24 having an outwardly projecting flange 26 which engages fan 21 and clamps it into abutting relationship with a shoulder 28 projecting outwardly from the outer surface of collet 20. The internal diameter of sleeve 24 is slightly less than the outside diameter of end portion 22 of collet 20, so that as sleeve 24 is assembled onto portion 22, portion 22 is compressed into firm engagement with shaft 18. This arrangement is enhanced by knurling shaft 18 as shown at 25. A washer 29 made from cardboard fiber is disposed between flange 26 of sleeve 24 and fan 21.

Bearing means are provided to support one end of shaft 18 and include a substantially spherical support bearing 30 through which shaft 18 passes. A second spherical support bearing similar to support bearing 30 may be provided at the other end of shaft 18; however, for the sake of simplicity only one support bearing arrangement has been described. Support bearing 30 is carried by a plurality of tabs 32 bent out from a portion of casing 12. Moreover, support bearing 30 is maintained in supported relationship with tabs 32 by a plurality of tabs 34 bent out from a member 36 suitably secured to the inner surface of casing 12 by such means as welding or threaded screw fasteners or simply a press fit into casing 12.

A lubrication system for the above described bearing means includes a reservoir wick 38 of generally cylindrical configuration supported within a chamber 40 defined by housing 42 and the outer surface of casing 12. A combined feeder and return wick 44 having feeder wick portions 46 and return wick portion 48 is also provided. Feeder wick portions 46 are in lubricant receiving relationship with reservoir wick 38 and are adapted to convey lubricant by capillary action from reservoir wick 38 to shaft 18. Lubricant received from feeder wick portions 46 migrates along shaft 18 through support bearing 30 to the thrust bearing assembly 60 which is described below thereby providing lubrication between rotating shaft 18 and non-rotating spherical bearing 30 and to the thrust bearing.

Openings 50 are provided in member 36 and casing 12 through which return wick portions 48 pass. An annular collecting means 52 is supported by casing 12 to catch and collet any excessive lubricant which is flung from shaft 18. The purpose of return wick portions 48 is to pick up and return directly to shaft 18 lubricant collected by collecting means 52. Excessive lubricant collected by collecting means 52 which return wick portions 48 are unable to convey that quantity of lubricant out of collecting means 52 will pass through openings 50 into chamber 40 and return to reservoir wick 38 thereby avoiding any loss of lubricant from collecting means 52 into the interior of casing 12.

The foregoing lubrication system is a minor variation of the system disclosed and claimed by Thomas E. Jenkins in the aforementioned U.S. Pat. No. 3,393,025. As will become evident as this description proceeds, the exact lubrication system is not critical to the present invention and may depart considerably from that disclosed. It is important only that in embodiments of the present invention employing thrust bearings formed from powdered metal compositions, some means is provided to supply lubricant to the thrust bearing assembly 60.

In accordance with the present invention, a thrust bearing assembly 60 is provided that includes an annular thrust bearing 62 loosely carried on drive shaft 18 and having a first thrust bearing surface 64 facing surface 31 of support bearing 30, and a second thrust bearing surface 66 facing opposite the first thrust bearing surface, that is away from support bearing 30. Thrust bearing 62 is positioned on shaft 18 adjacent surface 31 of spherical support bearing 30 such that first thrust bearing surface 64 of thrust bearing 62 may engage surface 31 of support bearing 30. To insure that surface 64 rotates against surface 31, thrust bearing 62 is drivingly connected to shaft 18 for rotation with the shafts in a manner described further on.

As previously mentioned, the lubrication system causes oil to migrate along shaft 18. A portion of this oil migrates radially across surface 64 of thrust bearing 62 to form a protective lubricating film. When operating at high speed such as experienced with a dishwasher pump motor, there is a tendency for the centrifugal forces generated by the rotation of thrust bearing 62 to sling lubricating oil radially outwardly at a rate which could result in at least partial removal of the oil film on thrust bearing surface 64. In order to maintain an adequately lubricated thrust bearing surface, thrust bearing 62 is formed from a relatively porous material such as a powdered or sintered metal composition. In the illustrative embodiment thrust bearing 62 is made from a powdered iron composition including approximately three percent by weight of powdered copper. The addition of the small percentage of copper provides a degree of self lubricity. The porosity of the bearing material enables the thrust bearing 62 to absorb lubricating oil which migrates along shaft 18 to thrust bearing 62 from feeder wick 46. Since a portion of this oil is absorbed in the bearing itself, the protective film will not be entirely removed from the thrust bearing surface 64 by centrifugal forces when rotating at high speed.

To insure proper wear of thrust bearing 62 it is important that thrust bearing 62 rotates against surface 31 of spherical bearing 30. Simply loosely mounting thrust bearing 62 to shaft 18 could result in intermittent rotation of surface 66 of thrust bearing 62 against surface 65 of collet 20, which is not constructed to function as a thrust bearing surface. Wear on surface 66 resulting from rotation against surface 65 could severely shorten the life of bearing 62. Thus, thrust bearing 62 is drivingly connected to shaft 18 for rotation with the shaft. A convenient way of doing this would be to press fit the thrust bearing 62 to shaft 18. However, the powdered metal composition of thrust bearing 62, while being strong in compression, is relatively weak in tension. Thus, fitting of the bearing to the shaft would subject thrust bearing 62 to tensile stress likely to result in cracking of the bearing during assembly or during operation. Thus, it is important that thrust bearing 62 be loosely mounted to shaft 18, that is, the inside diameter of thrust bearing 62 should be slightly greater than the diameter of shaft 18 to preclude subjecting bearing 62 to tensile stress.

To facilitate rotation of bearing 62 with shaft 18, thrust bearing assembly 60 includes a drive ring 70. As shown most clearly in FIG. 2, drive ring 70 is mounted to shaft 18 adjacent thrust bearing surface 66 of thrust bearing 62. Drive ring 70 includes a thrust transmitting surface 72 which faces thrust bearing surface 66 of thrust bearing 62. Means for drivingly connecting drive ring 70 to thrust bearing 62 are provided in the form of a set of bearing engaging fingers 74 which project from the outer periphery of drive ring 70 to engage corresponding slots 68 of thrust bearing 62. Each one of fingers 74 includes a tab portion 76. When fingers 74 are properly received in slots 68 of bearing 62, tab portions 76 extend beyond bearing 62 and deflect inwardly over a portion of surface 64 of thrust bearing 62 to properly position thrust bearing 62 adjacent drive ring 70. These tab portions are particularly useful in retaining thrust bearing 62 in proper position during assembly.

Means for drivingly connecting drive ring 70 to shaft 18 are provided in the form of a set of collet engaging fingers 78. Fingers 78 project from the inner periphery of drive ring 70 toward collet 20 to engage corresponding longitudinal slots 23 formed in the end portion 22 of collet 20 facing drive ring 70. With this arrangement, rotary motion of shaft 18 is coupled from the shaft to collet 20 which is compression fit to the shaft; from collet 20 to drive ring 70 by fingers 78 engaged in slots 23; and from drive ring 70 to thrust bearing 62 through fingers 74 engaged in slots 68 of thrust bearing 62. While in the illustrative embodiment two fingers comprise each set of fingers 74 and 78, it is apparent that at least one finger per set is required and that any number more than one per set could be used. While only two fingers 74 are provided, the illustrative embodiment includes four slots 68 on the periphery of thrust bearing 62. This enhances manufacturing convenience as the additional pair of slots facilitating alignment of the bearing during assembly. A pressed fiber lubricant seal 82 is press fit to shaft 18 and disposed between thrust bearing 62 and drive ring 70. This lubricant seal serves as a barrier to the lubricating oil migrating along shaft 18.

In assembling the thrust bearing structure, fingers 78 of drive ring 70 are aligned with slots 23 in collet 20 and inserted in slots 23 such that drive ring 70 abuts collet 20. Lubricant seal 82 is then positioned to abut drive ring 70. Since lubricant seal 82 is press fit to shaft 18, it serves to hold drive ring 70 in position during assembly. Thrust bearing ring 62 is then snapped into position with surface 66 adjacent thrust transmitting surface 72 of drive ring 70 and in pressing engagement with lubricant seal 82 and fingers 74 of drive ring 70 received in slots 68 of thrust bearing 62. Thrust bearing 62 is held in this position during assembly by tabs 76. Assembled in this fashion, thrust bearing assembly 60 is in position for engagement with support bearing 30 when shaft 18 is positioned in bearing 30.

Other materials may be used to form thrust bearing 62 in keeping with the invention including materials having self-lubricating properties. One such material which has been found to be a particularly useful thrust bearing material is a carbon graphite composition or, more simply, graphite. Like the powdered metal bearings, graphite thrust bearings are relatively weak in tension and should be loosely carried on the drive shaft. A thrust bearing assembly in accordance with the present invention in which thrust bearing 62 is formed of graphite is particularly advantageous in applications in which lubricating means are not provided for lubricating the support bearings. Because of the self-lubricating properties of the graphite bearing, lubricating means are not required for the thrust bearing assembly. In such applications in which oil would not be migrating along shaft 18, oil seal 82 could be omitted from thrust bearing assembly 60.

As will be evident from the foregoing description, the invention is not limited to the particular details and construction of the examples illustrated and it is contemplated that various other modifications or applications will occur to those skilled in the art. It is therefore intended that the appended claims shall cover such modifications and applications as do not depart from the true spirit and scope of the invention.

What is claimed is:

1. A thrust bearing assembly for use in a motor structure to absorb the axial thrust of the motor drive shaft, the shaft being rotatably supported by at least one non-rotating support bearing, said thrust bearing assembly comprising:

an annular thrust bearing loosely carried on the drive shaft adjacent the support bearing, having a first thrust bearing surface facing the support bearing, a second thrust bearing surface facing opposite from said first thrust bearing surface, and at least one slot formed on the outer periphery of said thrust bearing;

a drive ring carried on the drive shaft, having a thrust transmitting surface facing said second thrust bearing surface of said thrust bearing and having at least one bearing engaging finger projecting from the outer periphery of said drive ring and engaging said one slot on said thrust bearing for rotating said bearing with said drive ring; and a collet fixedly mounted to the drive shaft, said collet having one end disposed adjacent said drive ring opposite said thrust bearing and having at least one longitudinal slot formed in said one end, and at least one collet engaging finger projecting from the inner periphery of said drive ring and received in said at least one longitudinal slot in said collet for rotating said drive ring with the drive shaft whereby said thrust bearing rotates with the drive shaft and absorbs axial thrust exerted by the drive shaft toward the support bearing.

2. A thrust bearing assembly for use in a motor structure to absorb the axial thrust of the motor drive shaft, the drive shaft being rotatably supported by at least one non-rotating support bearing for rotation about a generally horizontal axis, said thrust bearing assembly comprising:

an annular thrust bearing loosely carried on the drive shaft adjacent the support bearing, said thrust bearing having first and second oppositely facing thrust bearing surfaces and a plurality of spaced apart slots formed on the outer periphery of said thrust bearing; said first thrust bearing surface facing the support bearing;

an annular drive ring carried on said shaft and having a thrust transmitting surface which faces said second thrust bearing surface; said drive ring having a first set of fingers projecting from its outer periphery generally toward said thrust bearing, said first set of fingers being received in corresponding ones of said thrust bearing slots for rotating said thrust bearing with said drive ring;

a collet fixedly mounted to the drive shaft for rotation and translation therewith, adjacent said drive ring; said collet including a set of longitudinal slots; said drive ring further having a second set of fingers projecting from its inner periphery generally away from said thrust bearing; said second set of fingers being received in corresponding ones of said longitudinal slots for rotating said drive ring with the drive shaft, whereby said thrust bearing is coupled to the drive shaft for rotation therewith by said drive ring, and absorbs axial thrust exerted by the shaft toward the support bearing.

3. The thrust bearing assembly of claim 1 or claim 2 wherein said thrust bearing is formed of a powdered metal.

4. The thrust bearing assembly of claim 3 wherein said powdered metal is a composite of powdered iron and copper.

5. The thrust bearing assembly of claim 3 further comprising means for supplying lubricant to said thrust bearing and a lubricant seal press fit on said shaft and disposed between said thrust bearing and said drive ring.

6. The thrust bearing assembly of claim 1 or claim 2 wherein said thrust bearing is formed from graphite.

7. The thrust bearing assembly of claim 9 wherein each of said first set of fingers includes an inwardly deflected tab portion which projects over a portion of said second thrust bearing surface for positioning said thrust bearing adjacent said drive ring.

* * * * *

UNITED STATES PATENT AND TRADEMARK OFFICE
CERTIFICATE OF CORRECTION

PATENT NO. : 4,293,170
DATED : October 6, 1981
INVENTOR(S) : Bernard J. Brezosky It is certified that error appears in the above-identified patent and that said Letters Patent are hereby corrected as shown below:

Column 8, line 26, change claim "9" to read claim "2."

Signed and Sealed this

Fifth Day of January 1982

[SEAL]

Attest:

Attesting Officer

GERALD J. MOSSINGHOFF

Commissioner of Patents and Trademarks